United States Patent
Suzuki et al.

(10) Patent No.: US 7,375,147 B2
(45) Date of Patent: May 20, 2008

(54) INK JET RECORDING METHOD AND APPARATUS

(75) Inventors: Atsushi Suzuki, Minamiashigara (JP); Nobuyuki Ichizawa, Minamiashigara (JP); Yoshiro Yamashita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 336 days.

(21) Appl. No.: 10/864,337

(22) Filed: Jun. 10, 2004

(65) Prior Publication Data

US 2004/0254264 A1 Dec. 16, 2004

(30) Foreign Application Priority Data

Jun. 11, 2003 (JP) ............... 2003-166483

(51) Int. Cl.
*C09D 11/00* (2006.01)
(52) U.S. Cl. ................... 523/160; 523/161; 106/31.27; 106/31.28; 106/31.6; 524/556
(58) Field of Classification Search ............... 523/160, 523/161; 106/31.27, 31.28, 31.6; 524/556
See application file for complete search history.

(56) References Cited

U.S. PATENT DOCUMENTS

| | | | | |
|---|---|---|---|---|
| 5,160,370 A | * | 11/1992 | Suga et al. ................ | 524/376 |
| 6,354,693 B1 | * | 3/2002 | Looman et al. ............. | 347/43 |
| 6,607,266 B2 | * | 8/2003 | Katsuragi et al. .......... | 347/96 |
| 6,848,781 B2 | * | 2/2005 | Ogino et al. .............. | 347/105 |
| 7,029,109 B2 | * | 4/2006 | Shirota et al. ............ | 347/100 |
| 2004/0119801 A1 | * | 6/2004 | Suzuki et al. ............ | 347/100 |

FOREIGN PATENT DOCUMENTS

| | | | |
|---|---|---|---|
| JP | 2001253097 A | * | 9/2001 |
| JP | 2001288390 A | * | 10/2001 |
| JP | A-2001-294788 | | 10/2001 |
| JP | 2002121438 A | * | 4/2002 |

OTHER PUBLICATIONS

Machine Translation of JP 2001-294788 (2001).*
Machine Translation of JP 2001-288390 (2001).*
Machine Translation of JP 2002-121438 (2002).*
Machine Translation of JP 2001-253097 A (2001).*

* cited by examiner

*Primary Examiner*—Bernard Lipman
(74) *Attorney, Agent, or Firm*—Oliff & Berridge, PLC (57) ABSTRACT

Ink jet recording method and apparatus is provided in which a color image is recorded by discharging, onto a recording medium, a black ink and at least one of a cyan ink, a magenta ink and a yellow ink from a black-ink recording head that ejects the black ink onto the recording medium, and a color-ink recording head that ejects the at least one of a cyan ink, a magenta ink and a yellow ink onto the recording medium, wherein the black ink contains carbon black, water, a water-soluble organic solvent, and a water-soluble polymer having an anionic functional group, and has a drying time of 5 seconds or more on the recording medium, and at least one type of the color ink contains a color material, water, a water-soluble organic solvent, and a coagulating agent, and has a drying time of 5 seconds or less on the recording medium.

20 Claims, 2 Drawing Sheets

INK JET RECORDING METHOD AND APPARATUS

CROSS-REFERENCE TO RELATED APPLICATION

This application claims priority under 35 USC 119 from Japanese Patent Application No. 2003-166483, the disclosure of which is incorporated by reference herein.

BACKGROUND OF THE INVENTION

1. Field of the Invention

The present invention relates to ink jet recording method and apparatus, that are used for printers, copying machines, facsimile machines, word processors and the like.

2. Description of the Related Art

In principle, ink jet recording is carried out by ejecting droplets of a liquid or molten solid ink from a nozzle, a slit or a porous film and the like, to thereby record onto a printing medium such as paper, fabric or film. In order to eject ink, various methods have been proposed such as the so-called static control method, utilizing static attraction, the method utilizing oscillation pressure of a piezoelectric element; and the so-called heat ink jet method, which utilizes pressure that is generated from air bubble formation and growth with heat. By employing these methods, images with a remarkably high level of detail can be created.

Ink jet recording apparatuses have been extensively examined since they provide advantages such as being compact, inexpensive and quiet. Recently, ink jet recording apparatuses capable of high-quality printing like a monochrome printer which forms black images and a color printer which provides full-color images have come to be widely sold. These printers can record on plain paper such as writing paper or copier paper, and occupy a major portion of the printing apparatus market.

The ink for ink jet recording used in the ink jet apparatuses must be able to achieve the following:

(1) provide images having high resolution, high density and uniformity, without bleeding or fogging on paper;
(2) cause no clogging at the tip of the nozzle due to dried ink, and exhibiting good ejecting responsiveness and good ejecting stability;
(3) be quick-drying on paper;
(4) provide fastness of images; and
(5) possess good long-term storability.

In particular, with the recent rise in printing speeds, there has been a demand for a quick-drying ink capable of providing very high-quality images even when recording is carried out on plain paper such as copier paper.

Further, as an ink jet recording ink, ink that mainly contains a dye as color material has been used. However, the ink using a dye has deteriorated water resistance and light fastness of an image. In order to solve these problems, an ink that contains a pigment as the color material has been considered.

In order to correspond to the recent rise in printing speeds, a method of expediting the drying of ink has also been carried on. However, if the drying of ink is simply quickened, deterioration of image density is caused. To this end, a method has been considered in which inks aggregate on recording paper due to a reaction between the inks to thereby improve the image density.

For example, Japanese Patent Application Laid-Open (JP-A) No. 2001-294788 discloses an inkjet recording method in which a color ink is printed in a printing area of a black ink using an ink set in which the drying time of each of the black ink and the color ink is 5 seconds or less and the color ink contains a coagulating agent that aggregates components in the black ink.

The above-described method disclosed by JP-A No. 2001-294788 has achieved quick drying of a printed image and a high optical density of an image, and also has solved image bleeding occurring between different colors. However, if the drying time of a black ink that contains, as a black pigment of the black ink, carbon black having excellent optical density, water resistance and light fastness is quickened, the image quality of a black image portion, such as sharpness of an image edge portion, no thickening of a line, and the like is deteriorated in the existing circumstances, and improvements therefore have been demanded.

SUMMARY OF THE INVENTION

The present invention has been achieved in view of the various circumstances in the above conventional methods, and is to provide ink jet recording method and apparatus, which uses carbon black as a black pigment that is excellent in optical density, water resistance, and light fastness, and further satisfies the image quality of a black image portion, such as sharpness in an image edge portion, no thickening of a line, and the like.

A first aspect of the present invention is to provide an ink jet recording method in which a color image is recorded by discharging, onto a recording medium, black ink, and color ink including at least one of a cyan ink, a magenta ink, and a yellow ink, wherein the black ink contains carbon black, water, a water-soluble organic solvent, and a water-soluble polymer having an anionic functional group, and has a drying time of 5 seconds or more on the recording medium, and at least one kind of the color ink contains color material, water, a water-soluble organic solvent, and a coagulating agent, and has a drying time of 5 seconds or less on the recording medium.

A second aspect of the present invention is to provide an ink jet recording apparatus comprising a black-ink recording head that ejects a black ink onto a recording medium, and a color-ink recording head that ejects at least one of a cyan ink, a magenta ink and a yellow ink, onto the recording medium, the apparatus carrying out recording of a color image by discharging the black ink and the color ink onto the recording medium, wherein the black ink contains carbon black, water, a water-soluble organic solvent, and a water-soluble polymer having an anionic functional group, and has a drying time of 5 seconds or more on the recording medium, and at least one kind of the color ink contains color material, water, a water-soluble organic solvent, and a coagulating agent, and has a drying time of 5 seconds or less on the recording medium.

DETAILED DESCRIPTION OF THE INVENTION

The present invention will be hereinafter described in detail.

An ink jet recording method of the present invention is characterized in that an image is formed with a black ink containing carbon black, water, a water-soluble organic solvent and a water-soluble polymer having an anionic functional group and having a drying time of 5 seconds or more on a recording medium, and a color ink containing color material, water, a water-soluble organic solvent, and a coagulating agent and having a drying time of 5 seconds or less on a recording medium of the ink. The color ink is comprised of at least one of cyan ink, magenta ink and yellow ink, and at least one kind of the color ink may have the above-described composition. Further, the order of printing the black ink and the color ink (these inks may occasionally be referred simply as "ink" in a collective manner) may not be determined.

In the ink jet recording method of the present invention, due to an image being formed using the black ink containing a water-soluble polymer having an anionic functional group and having the drying time of 5 seconds or more (slow drying), and the color ink containing a coagulating agent and having the drying time of 5 seconds or less (quick drying), the image quality of a black image portion, such as sharpness in an image edge portion, no thickening of a line, and the like can be satisfied even if carbon black is used as a black pigment having excellent optical density, water resistance and light fastness.

Although the reason for the image quality of a black image portion is thus satisfied is not exactly known, it is considered that, even if a black ink that is dried slowly is used, an anionic functional group of a water-soluble polymer in the black ink, and metal salt or a cationic functional group of a coagulating agent in the color ink interact with each other, and even in a state in which a black image portion with the black ink and the color ink used in combination is dried quickly, the image quality of the black image portion, for example, the sharpness in an image edge portion, no thickening of a line, and the like is improved.

In the ink jet recording method of the present invention, particularly, a portion or all of a black image portion in a color image is suitably formed with a black ink and a color ink. In the region with the black ink and the color ink used in combination, the black ink and the color ink are ejected and printed in such a manner that the equivalent ratio of an anionic functional group of a water-soluble polymer contained in the black ink to a metal or a cationic functional group of a coagulating agent contained in the color ink is preferably in the range of 0.1 to 1.5, more preferably in the range of 0.5 to 1.5, and further preferably in the range of 0.8 to 1.1.

The equivalent ratio mentioned above (the ratio of equivalent between the metal or cationic functional group of the coagulating agent, and the anionic functional group) is a value per unit area ($/mm^2$). If the ratio of equivalence is too small, the image density may become low. Further, if the ratio of equivalence is too large, the drying characteristics of the black image may be deteriorated.

By using the black ink and the color ink in combination so that the ratio of equivalent is defined in the above range, the anionic functional group of the water-soluble polymer in the black ink and the metal salt or cationic functional group of the coagulating agent in the color ink can be made to interact with each other more effectively, and the black image portion can be dried quickly, and the image quality of the black image portion, for example, the sharpness in an image edge portion, no thickening of a line, and the like is improved.

The equivalent of the anionic functional group of the water-soluble polymer in the black ink can be calculated from the amount of ink per unit area ($/mm^2$), the amount and an acid value of the water-soluble polymer contained in the ink. The equivalent value of metal of the coagulating agent (for example, polyvalent metal salt) can also be calculated similarly from a molecular weight of metal, the amount of metal contained in the ink, and the amount of ink per unit area ($/mm^2$).

Further, as long as the above-described relationship of equivalent value is satisfied, no particular limitation is made. However, in the region in which the black ink and the color ink are used in combination (a printing region), the amount of color ink ejected is preferably 0.05 to 1, more preferably 0.05 to 0.5, and further preferably 0.1 to 0.3 relative to the amount of the black ink ejected.

If the ratio of ink amount (the ratio of the amount of color ink to the amount of black ink) is too large, a problem is liable to occur that a paper portion corresponding to the printing region may deform so as to be lifted up, thereby coming into contact with a printing head. If the ratio of ink amount is too small, a problem is liable to occur that the drying time of an image may become longer.

In the ink jet recording method of the present invention, preferably, the amount of the color ink ejected is varied according to the size of the printing region of the black ink so that the equivalent ratio and the ratio of ink amount are defined in the above-described respective ranges.

Further, in order that the anionic functional group of the water-soluble polymer in the black ink, and the metal salt or cationic functional group of the coagulating agent in the color ink may be made to interact with each other, the time lag between printing with the black ink and printing with the color ink is preferably 20 milliseconds or less, more preferably 1 to 20 milliseconds, and further preferably 1 to 18 milliseconds.

In the ink jet recording method, for example, recording is carried out by ejecting droplets of each ink from an orifice to a recording medium in accordance with a recording signal. The ink amount for each droplet of the ejected ink is preferably 20 ng or less, more preferably 15 ng or less, and further preferably 1 to 15 ng. Further, it is preferable that the amount of one droplet of the black ink is more than the amount of one droplet of the color ink. Due to these inks being recorded in the respective defined ranges of the ink amounts, a high-quality image is obtained without damaging the drying characteristics of the inks. In the case of printing using the ink droplets in the amount that does not fall in the above defined ranges, the effect for improvement of the image quality decreases.

If the amount of each ink is too large, a phenomenon that a recording medium may deform or ink may penetrate into the reverse side of the recording medium is liable to occur. Therefore, the amount of each ink is properly selected.

The ink jet recording method of the present invention can also be applied to a so-called heat ink jet method that forms ink droplets by utilizing pressure generated from air bubble formation and growth with heat, and a so-called piezoelectric ink jet method that forms ink droplets by utilizing pressure of a piezoelectric element.

Next, these inks will be described in further detail.

Black Ink and Color Ink

The black ink contains at least carbon black, water, a water-soluble organic solvent, and a water-soluble polymer having an anionic functional group. Each color ink contains at least color material, water, and a water-soluble organic solvent. Further, at least one of the color inks contains a coagulating agent (suitably, polyvalent metal salt).

These inks each may contain, if desired, a dispersing agent, a penetrating agent, urea and/or urea derivatives, a pH regulating agent, and other additives.

Ink components will be first described respectively. Next, the physical properties of the inks used by the present invention, and a preparation method of the inks used by the present invention will be described.

Carbon Black

As the carbon black, carbon black pigments such as furnace black, lamp black, acetylene black and channel black are preferable. For example, Raven 7000, Raven 5750, Raven 5250, Raven 5000 ULTRA II, Raven 3500, Raven 2500 ULTRA, Raven 2000, Raven 1500, Raven 1255, Raven 1250, Raven 1200, Raven 1190 ULTRA II, Raven 1170, Raven 1080 ULTRA, Raven 1060 ULTRA, Raven 790 ULTRA, Raven 780 ULTRA, Raven 760 ULTRA (all of these manufactured by Colombian Carbon Company); Rega 1400R, Rega 1330R, Rega 1660R, Mogul L, Monarch 700, Monarch 800, Monarch 880, Monarch 900, Monarch 1000, Monarch 1100, Monarch 1300, Monarch 1400 (all of these manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all of these manufactured by Degussa AG); No. 25, No. 33, No. 40, No. 47, No. 52, No. 900, No. 2300, MCF-88, MA600, MA7, MA8, MA100 (all of these manufactured by Mitsubishi Chemical Co., Ltd.), and the like can be used.

Further, a carbon black pigment that is newly synthesized for the present invention may also be used.

Magnetic microparticles such as magnetite or ferrite; titanium black; or the like may be used together with these carbon black pigments. The pigments of three primary colors of cyan, magenta and yellow, the pigments of predetermined colors such as red, green, blue, brown, white or the like, metallic gloss pigments such as gold, silver or the like, colorless extender pigments, plastic pigments and the like may be used together.

A self-dispersible pigment is preferably used as the carbon black. The self-dispersible pigment refers to a pigment that is dispersible by itself in a solvent in the absence of so-called dispersing agent such as a surface active agent or a polymer dispersing agent. Generally, the self-dispersible pigment has a hydrophilic functional group at the surface thereof.

A determination as to whether the carbon black (pigment) is "self-dispersible" or not is confirmed by the following self-dispersibility test.

Test for Determining Self-Dispersibility

A test pigment is added to and dispersed in water in the absence of a dispersing agent, using an ultrasonic homogenizer, a nanomizer, a microfluidizer, a ball mill or the like, followed by diluting with water to bring an initial pigment concentration to about 5%. Furthermore, 100 g of the resultant dispersing agent is charged into a glass bottle having a diameter of 40 mm and maintained standing for 1 day, and the concentration of the pigment in a supernatant is determined. When a ratio of the pigment concentration determined after 1 day standing, relative to the initial pigment concentration, (hereinafter referred to as "self-dispersibility index") is 98% or higher, it is rated as "self-dispersible".

During this evaluation, the method for determining the concentration of the carbon black (pigment) is not specifically limited to methods, such as those comprising drying the sample and measuring a solids content thereof, diluting the sample to an appropriate concentration and measuring the concentration from the transmittance of the sample. If other methods for precisely determining the concentration of the pigment are available, such methods may be used as well.

To introduce a hydrophilic functional group into the carbon black (pigment), any of known methods and newly invented methods may be used. Known treating methods, for example, oxidizing treatments using an oxidizing agent (such as nitric acid, permanganates, bichromates, hypochlorites, ammonium persulfate, hydrogen peroxide, ozone or ozone water); sulfonation treatments; treatments using a coupling agent such as silane compounds; polymer grafting treatments; plasma treatments; or treatments using a diazonium salt compound having a hydrophilic group may be used, and newly developed methods may also be used. These methods may be used in combination. The amount of the hydrophilic functional group can be adjusted by controlling a processing density, processing time and the like, and a surface functional group of a commercially available self-dispersible pigment can be adjusted due to denaturation such as esterification.

Examples of the commercially available self-dispersible pigments may be MICROJET (BONJET) BLACK CW-1, BONJET BLACK CW-2 and BONJET BLACK CW-3 (manufactured by Orient Chemical Industries Ltd.), and CAB-O-JET 200 and CAB-O-JET 300 (manufactured by Cabot Corporation). Any of these commercially available self-dispersible pigments has a self-dispersibility index of 100%.

The amount of the carbon black (pigment) contained in the black ink is preferably in the range of 0.1 to 10% by mass, more preferably 1 to 7% by mass, and further preferably 1 to 5% relative to the total amount of the black ink. If the content of the pigment is too large, clogging at the tip of a nozzle when water evaporates becomes worse. Further, if the content of the pigment is too small, of course, satisfactory concentration of the pigment cannot be obtained.

Color Material

Either of a dye and a pigment can be used as the color material, but a dye is preferably used because it makes it possible to easily obtain a color image having excellent coloring properties. Among various dyes, a water-soluble dye is preferable. Any of an acidic dye, a direct dye, a basic dye and a reactive dye may be used as the water-soluble dye. Among the dyes, the acidic dye and the direct dye are preferable.

Examples of the above dye include, but are not limited to, the following:

C.I. Direct Blue-1, -2, -6, -8, -22, -34, -70, -71, -76, -78, -86, -112, -142, -165, -199, -200, -201, -202, -203, -207, -218, -236, and -287;

C.I. Direct Red-1, -2, -4, -8, -9, -11, -13, -15, -20, -28, -31, -33, -37, -39, -51, -59, -62, -63, -73, -75, -80, -81, -83, -87, -90, -94,-95, -99, -101, -110, -189, and -227;

C.I. Direct Yellow-1, -2, -4, -8, -11, -12, -26, -27, -28, -33, -34, -41, -44, -48, -58, -86, -87, -88, -135, -142, and -144;

C.I. Acid Blue-1, -7, -9, -15, -22, -23, -27, -29, -40, -43, -55, -59, -62, -78, -80, -81, -83, -90, -102, -104, -111, -185, -249, and -254;

C.I. Acid Red-1, -4, -8, -13, -14, -15, -18, -21, -26, -35, -37, -52, -110, -144, -180, -249, and -257;

C.I. Acid Yellow-1, -3, -4, -7, -11, -12, -13, -14, -18, -19, -23, -25, -34, -38, -41, -42, -44, -53, -55, -61, -71, -76, -78, -79, and -122; and the like.

The content of these dyes is preferably in the range of 0.1 to 20% by mass, more preferably in the range of 1 to 10% by mass, and further preferably in the range of about 1 to 5% by mass relative to the total amount of the color inks. If the content of the dyes is too large, clogging at the tip of a nozzle when water evaporates becomes worse. Further, if the content of the dyes is too small, of course, satisfactory concentration of the dyes cannot be obtained.

Examples of the color pigments are listed below.

Examples of a cyan color pigment may include, but are not limited to, C.I. Pigment Blue 1, C.I. Pigment Blue 2, C.I. Pigment Blue 3, C.I. Pigment Blue 15, C.I. Pigment Blue 15:1, C.I. Pigment Blue 15:3, C.I. Pigment Blue 15:4, C.I. Pigment Blue 16, C.I. Pigment Blue 22, C.I. Pigment Blue 60 and the like.

Examples of a magenta color pigment may include, but are not limited to, C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, C.I. Pigment Violet 1960 and the like.

Examples of a yellow color pigment may include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 55, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 150, C.I. Pigment Yellow 151, C.I. Pigment Yellow 154, C.I. Pigment Yellow 180, C.I. Pigment Yellow 185 and the like.

Besides the pigments of three primary colors of cyan, magenta and yellow, the pigments of predetermined colors such as red, green, blue, brown, white or the like, metallic gloss pigments such as gold, silver or the like, colorless extender pigments, plastic pigments and the like may be used. Further, a pigment that is newly synthesized for use in the present invention may also be used.

A self-dispersible pigment having a hydrophilic functional group introduced into the surface thereof can also be used and is preferably used in the present invention. To introduce a hydrophilic functional group, any of known methods and newly invented methods may be used. Known treating methods, for example, oxidizing treatments using an oxidizing agent (such as nitric acid, permanganates, bichromates, hypochlorites, ammonium persulfate, hydrogen peroxide, ozone or ozone water); sulfonation treatments; treatments using a coupling agent such as silane compounds; polymer grafting treatments; plasma treatments; or treatments using a diazonium salt compound having a hydrophilic group may be used, and newly developed methods may also be used. These methods may be used in combination. The amount of the hydrophilic functional group can be adjusted by controlling a processing density, processing time and the like, and a surface functional group of a commercially available self-dispersible pigment can be adjusted due to denaturation such as esterification. The meaning of the term "self-dispersible" is as mentioned above for the carbon black.

The content of these pigments is preferably in the range of 0.1 to 10% by mass, more preferably in the range of 1 to 7% by mass, and further preferably in the range of 1 to 5% by mass relative to the total amount of the color inks. If the content of the pigments is too large, clogging at the tip of a nozzle when water evaporates becomes worse. Further, if the content of the pigments is too small, of course, satisfactory concentration of the pigments cannot be obtained.

These color materials can be singly used, but also may be used in combination of two or more or may be colored with custom colors of red, blue, green or the like in addition to the three primary colors of cyan, magenta and yellow.

It is desirable to refine these color materials by removing impurities mixed in during the manufacturing process, such as residual oxidizing agents, processing agent or by-product materials, and other inorganic and organic impurities. Each content of calcium, iron and silicon in the ink is about 10 ppm or less and preferably about 5 ppm or less. Each content of these inorganic impurities can be measured by means of, for example, an inductively coupled plasma emission spectroscopy.

These impurities can be removed, for example, by a method of washing with water, a method using a reverse osmosis membrane or an ultrafiltration membrane, an ion exchange method or an adsorbing method using activated carbon or zeolite. These methods may be used either singly or in combination.

When a pigment is used as the color material, a dispersing agent for dispersing the pigment can be used.

Dispersing Agent

A surface active agent or a water-soluble resin can be used as the dispersing agent, and the water-soluble resin is preferably used for dispersing the pigment.

As the water-soluble resin that is used as the dispersing agent, known water-soluble resins such as a polymer obtained by polymerization reaction, natural resin and the like can be used. A polymer (copolymer) is preferably used. As the copolymer, a compound formed by copolymerization of at least one type of monomer having an α, β-ethylenically unsaturated group that constitutes a hydrophilic moiety, and at least one type of monomer having an α, β-ethylenically unsaturated group that constitutes a hydrophobic moiety is preferably used. Further, a homopolymer of a monomer having an α, β-ethylenically unsaturated group including a hydrophilic group can also be used.

As the monomer having an α, β-ethylenically unsaturated group that constitutes a hydrophilic moiety, monomers having a carboxyl group, a sulfonic acid group, a hydroxyl group, polyoxyethylene or the like can be used. Preferably, monomers containing a carboxyl group or a sulfonic acid group, for example, acrylic acid, methacrylic acid, crotonic acid, itaconic acid, monoester itaconate, maleic acid, monoester maleate, fumaric acid, monoester fumarate, vinyl sulfonate, styrene sulfonate, sulfonated vinyl naphthalene and the like are used. Among these, monomers containing a carboxyl group are particularly preferable, and examples thereof include acrylic acid, methacrylic acid, maleic acid, crotonic acid, itaconic acid, monoester itaconate, maleic acid, monoester maleate, fumaric acid, monoester fumarate and the like, but the present invention is not limited to the same.

Examples of the monomer having an α, β-ethylenically unsaturated group that constitutes a hydrophobic moiety include, but are not limited to, styrene derivatives such as α-methylstyrene and vinyltoluene, vinyl naphthalene, vinyl naphthalene derivatives, alkylester acrylate, alkylester methacrylate, alkylester crotonate, dialkylester itanonate, dialkylester maleate, and the like.

The mass-average molecular weight of the above polymer that is used as the water-soluble resin is not limited, but is preferably in the range of 3,000 to 15,000 and more preferably in the range of 4,000 to 7,000. If the mass-average molecular weight is less than the above defined range, the dispersion stability is deteriorated. If the mass-average molecular weight is more than 15,000, the viscosity of the ink increases and a problem may arise that the discharging properties of the ink becomes worse. Various methods for measuring the average molecular weight of a copolymer have been known. The mass average molecular weight in the present invention is a value measured by a GPC (gel permeation chromatography) method.

The dispersing agent is preferably used as a copolymer or neutralization salt thereof. The neutralization may be attained using various basic substances, but it is preferred to neutralize the copolymer by a basic substance containing at least one alkali metal hydroxide. As the alkali metal hydroxide, NaOH, KOH or LiOH may be used, but NaOH is preferably used.

Water-soluble Organic Solvent

Examples of materials used as the water-soluble organic solvent include: polyhydric alcohols such as ethylene glycol, diethylene glycol, propylene glycol, dipropylene glycol, butylene glycol, triethylene glycol, 1,5-pentanediol, 1,2,6-hexanetriol, trimethylolpropane, glycerin and polyethylene glycol; lower alcohols such as ethanol, isopropyl alcohol and 1-propanol; nitrogen-containing solvents such as pyrrolidone, N-methyl-2-pyrrolidone, cyclohexylpyrrolidone and triethanolamine; sulfur-containing solvents such as thiodiethanol, thiodiglycerol, sulfolane and dimethyl sulfoxide; propylene carbonate; ethylene carbonate; and sugars such as glucose, fructose, galactose, mannose and xylose, sugar-alcohols and their derivatives.

These water-soluble organic solvents may be used either singly or in combination of two or more. The content of the water-soluble organic solvent is in the range of 1 to 60% by mass, preferably in the range of 5 to 40% by mass relative to the total amount of the ink.

Water

It is preferable to use ion exchange water, ultrapure water, distilled water and ultrafiltered water to avoid the contamination with impurities.

Coagulating Agent

As the coagulating agent, polyvalent metal salt is suitably used from the standpoint of stability of the color ink.

Polyvalent metal salt is a salt that produces a bivalent or more cation derived from a metal element when dissolved in water. Examples of the polyvalent metal ion include aluminum ion, barium ion, calcium ion, copper ion, iron ion, magnesium ion, manganese ion, nickel ion, tin ion, titanium ion, and zinc ion.

Specific examples of the polyvalent metal salt include salts of the above polyvalent metal ion, with hydrochloric acid, bromic acid, hydroiodic acid, sulfuric acid, nitric acid, phosphoric acid, thiocyanic acid, an organic carboxylic such as acetic acid, oxalic acid, lactic acid, fumaric acid, phthalic acid, citric acid, salicylic acid and benzoic acid, or an organic sulfonic acid.

Specific examples of polyvalent metal salts include aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, manganese acetate, manganese salicylate, manganese benzoate, manganese lactate, nickel chloride, nickel bromide, nickel sulfate, nickle nitrate, nickel acetate, tin sulfate, titanium chloride, zinc chloride, zinc bromide, zinc sulfate, zinc nitrate, zinc thiocyanate and zinc acetate.

Among these polyvalent metal salts, aluminum sulfate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate and aluminum nitrate are preferably used.

In addition to the above-described polyvalent metal salts, it is also effectively to add and use, as the coagulating agent, monovalent electrolyte, a nonionic or anionic surface active agent having the hydrophobic property, a hydrophobic water-soluble solvent, or the like in the amount that is enough to prevent the dispersion of carbon black, or more. Examples of the monovalent electrolyte include inorganic salts such as sodium chloride, sodium sulfate, sodium sulfite and sodium nitrate, salts of alkali materials and organic acids such as acetate, lactate, benzoate and citrate. As a surface active material having a high hydrophobicity, for example, surface active agents having an HLB (hydrophile-lipophile balance) of 10 or less, and preferably 5 or less. Examples of the hydrophobic water-soluble solvent include those having the SP value (solubility parameter) of 12 or less, preferably 10 or less.

Particularly, in a case in which a pigment of the black ink (a dispersing agent or a functional group which is made self-dispersible), or a water-soluble polymer contained in the black ink is cationic, inorganic or organic salts that produce a bivalent or more anion, a polymer having an anionic group, and the like can be used as the coagulating agent. Examples of the inorganic or organic salts that produces a bivalent or more anion include compounds that contains a salt with sulfuric acid, sulfurous acid, phosphoric acid, phosphonic acid, organic carboxylic or sulfonic acid such as oxalic acid, fumaric acid, phthalic acid, citric acid and tartaric acid.

Further, the above electrolytes described in a case in which the pigment of the black ink (a dispersing agent, or a functional group that is made self-dispersible), or the water-soluble polymer contained in the black ink is anionic can also be used.

Water-soluble Polymer having an Anionic Group

As a water-soluble polymer having an anionic group, compounds that interact with a coagulating agent (suitably, polyvalent metal salt) contained in the color ink and causes aggregation of black ink can be used. When a pigment dispersing agent is used, the pigment dispersing agent may be used as the water-soluble polymer.

As the water-soluble polymer, known water-soluble resins such as a polymer obtained by polymerization reaction, natural resin and the like can be used. A polymer (copolymer) is preferably used. As the copolymer, a compound formed by copolymerization of at least one type of monomer having an α, β-ethylenically unsaturated group that constitutes a hydrophilic moiety, and at least one type of monomer having an α, β-ethylenically unsaturated group that constitutes a hydrophobic moiety is preferably used. Further, a homopolymer of a monomer having an α, β-ethylenically unsaturated group including an anionic hydrophilic group can also be used.

As the monomer having an α, β-ethylenically unsaturated group that constitutes an anionic hydrophilic moiety, monomers having a carboxyl group, a sulfonic acid group, or the like can be used. For example, acrylic acid, methacrylic acid, crotonic acid, itaconic acid, monoester itaconate, maleic acid, monoester maleate, fumaric acid, monoester fumarate, vinyl sulfonate, styrene sulfonate, sulfonated vinyl naphthalene and the like are used. Among these, monomers containing a carboxyl group is particularly preferable, and examples thereof include acrylic acid, methacrylic acid, maleic acid, crotonic acid, itaconic acid, monoester itaconate, maleic acid, monoester maleate, fumaric acid, monoester fumarate and the like, but the present invention is not limited to the same.

Examples of the monomer having an α, β-ethylenically unsaturated group that constitutes a hydrophobic moiety include, but are not limited to, styrene, styrene derivatives such as α-methylstyrene and vinyltoluene, vinyl naphthalene, vinyl naphthalene derivatives, alkylester acrylate, alkylester methacrylate, alkylester crotonate, dialkylester itaconate, dialkylester maleate, and the like.

The acid value of the water-soluble polymer is preferably in the range of 100 to 300, and further preferably in the range of 130 to 200. If the acid value is lower than this range, the stability of the ink is liable to be deteriorated. If the acid value is higher than this range, the image density is liable to be low.

The mass-average molecular weight of the water-soluble polymer is preferably in the range of 3,000 to 10,000, and more preferably in the range of 4,000 to 7,000. If the mass-average molecular weight is lower than the defined range, the image density is liable to become low. If the mass-average molecular weight exceeds 10,000, the viscosity of the ink becomes high, and a problem is liable to occur that the discharging properties of the ink may become worse. Various methods are known as a method for measuring an average molecular weight of a copolymer. The mass average molecular weight in the present invention is a value measured by a GPC (gel permeation chromatography) method.

The water-soluble polymer is preferably used as a copolymer or neutralization salt thereof. The neutralization may be attained using various basic substances, but it is preferred to neutralize the copolymer by a basic substance containing at least one alkali metal hydroxide. As the alkali metal hydroxide, NaOH, KOH or LiOH may be used, but NaOH is preferably used.

Other additives

In order to adjust the drying time of the ink, for example, various penetrating agents are used for the ink. The penetrating agent is preferably a surface active agent or a penetrating solvent.

As these surface active agents, various anionic surface active agents, nonionic surface active agents, cationic surface active agents, amphoteric surface active agents and the like are used. Preferably, anionic surface active agents and nonionic surface active agents are used.

Specific examples of the surface active agent are listed below:

Examples of the anionic surface active agent include alkylbenzene sulfonate, alkylphenyl sulfonate, alkylnaphthalene sulfonate, higher fatty acid salt, sulfate of higher fatty acid ester, sulfonate of higher fatty acid ester, sulfate of higher alcohol ether, sulfonate of higher alcohol ether, higher alkyl sulfosuccinate, carboxylate of polyoxyethylene alkyl ether, sulfate of polyoxyethylene alkyl ether, alkyl phosphate, and phosphate of polyoxyethylene alkyl ether. Preferably, dodecylbenzene sulfonate, isopropylnaphthalene sulfonate, monobutylphenylphenol monosulfonate, monobutylbiphenyl sulfonate, and dibutylphenylphenol disulfonate are used.

Examples of the nonionic surface active agent include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethylene glycerine fatty acid ester, polyglycerine fatty acid ester, sucrose fatty acid ester, polyoxyethylene alkylamine, polyoxyethylene fatty acid amide, alkylalkanol amide, block copolymer of polyethylene glycol/polypropylene glycol, acetylene glycol and polyoxyethylene adduct of acetylene glycol. Preferably, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylol amide, block copolymer of polyethylene glycol/polypropylene glycol, acetylene glycol, and polyoxyethylene adduct of acetylene glycol.

Other examples of the surface active agent employable herein include silicone surface active agents such as polysiloxane-polyoxyethylene adduct, fluorine-based surface active agent such as perfluoroalkyl carboxylate, perfluoroalkyl sulfonate and oxyethylene perfluoroalkyl ether, and biosurfactant such as spiculisporic acid, rhamnolipide and lysolecithin.

These surface active agents may be used either singly or in combination. The HLB of the surface active agent is preferably in the range of 3 to 20 in the light of the dissolution stability.

The amount of these surface active agent added is preferably in the range of 0.001 to 5% by mass, and particularly preferably in the range of 0.01 to 3% by mass.

Further, as the penetrating agent, a compound that is represented by the following formula (1) may be used:

$$R\text{—}O\text{—}XnH \tag{1}$$

wherein R is a functional group selected from the group consisting of an alkyl group having 4 to 8 carbon atoms, an alkenyl group having 4 to 8 carbon atoms, an alkynyl group having 4 to 8 carbon atoms, a phenyl group, an alkylphenyl group, and an alkenylphenyl group and a cycloalkyl group; X is an oxyethylene group or an oxypropylene group; and n is an integer of 1 to 4.

Examples of the compound represented by the above formula (1) as the penetrating agent include ethyleneglycol monobutyl ether, diethyleneglycol monobutyl ether, propyleneglycol monobutyl ether, diethyleneglycol monohexyl ether, dipropyleneglycol monobutyl ether, triethyleneglycol monobutyl ether, triethyleneglycol monohexyl ether, diethyleneglycol monocyclohexyl ether, triethyleneglycol monophenylethyl ether, dioxypropylene oxyethylene monopentyl ether and the like. Among these, diethyleneglycol monobutyl ether is preferably used.

The compound represented by the above formula (1) as the penetrating agent can be preferably contained in the range of 1 to 20% by mass, more preferably 1 to 10% by mass relative to the total amount of the ink. The amount exceeding 20% by mass causes aggravation of bleeding and unstable ejection of the ink. The amount less than 1% by mass results in that the effect of adding the penetrating agent may not be easily obtained.

Further, the ink can contain urea and a urea derivative. Examples of urea and a urea derivative include urea, 1,1-dimethyl urea, 1,3-dimethyl urea, 1,1-diethyl urea, 1,3-diehtyl urea and the like. Preferably, urea is used. The content of urea and a urea derivative is 1 to 10% by mass, preferably 3 to 8% by mass relative to the total amount of the ink. If the content is 1% by mass or less, the effect of preventing clogging of a nozzle is low. If the content exceeds 10% by mass, image bleeding increases and image density is liable to become low.

Moreover, if necessary, a pH adjuster for controlling the pH of the ink is used for the ink. An acid (for example, hydrochloric acid, sulfuric acid, nitric acid, acetic acid, citric acid, oxalic acid, malonic acid, boric acid, phosphoric acid, phosphorous acid and lactic acid), a base (for example, potassium hydroxide, sodium hydroxide, lithium hydroxide, ammonium hydroxide, triethanol amine, diethanol amine, ethanol amine, 2-amino-2-methyl-1-propanol and ammonia), pH buffers (for example, phosphate, oxalate, amine salt, and Good's buffer) are preferably used.

The ink may further include poly-N-vinyl acetamide, polyvinyl alcohol, polyvinyl pyrrolidone, polyethylene glycol, cellulose derivative (for example, ethyl cellulose, carboxymethyl cellulose and the like), polysaccharides and derivatives thereof, other water-soluble polymers, polymer emulsion (for example, acrylic polymer emulsion, polyurethane-based emulsion and the like), cross-linking polymer (for example, cross-linked poly-N-vinyl acetamide, acrylic polymer and the like), a cyclodextrin, macrocyclic amines, dendrimer, crown ethers or the like, incorporated therein for adjustment of ink properties.

The ink may also include, if necessary, a mildewproofing agent (for example, benzoic acid, 1,2-benzisothiazolin-3-on, dehydroacetic acid, or the like), antiseptics, an oxidation inhibitor, a viscosity modifier, an electrically-conductive agent, a UV absorber, or a chelating agent.

Ink Composition

Preferred examples of the ink set comprised of the black ink and the color ink include, but are not limited to, the following:

(1) an ink set in which a black ink contains self-dispersible carbon black, and a water-soluble polymer having an anionic hydrophilic group, and a color ink contains polyvalent metal salt selected from a group consisting of aluminum sulfate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate, and aluminum nitrate; and (2) an ink set in which a black ink contains carbon black, and a water-soluble polymer having an anionic hydrophilic group, and a color ink contains polyvalent metal salt selected from a group consisting of aluminum sulfate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate, and aluminum nitrate.

Ink Properties

The drying time of the black ink is preferably 5 seconds or more, more preferably 5 to 15 seconds, and further preferably 5 to 10 seconds. The drying time of the color ink is preferably 5 seconds or less, more preferably 0.1 to 5 seconds, and further preferably 0.5 to 3 seconds.

The term "drying time of ink" mentioned herein means the time required by an ink being dried on a recording medium, that is, the time required until a printed image is no longer transferred to plain paper which is superposed thereon when a solid image of each ink is printed on the surface of plain paper by an ordinary ink jet recording apparatus. The plain paper mentioned herein means those generally used as plain paper, for example, copier paper, woodfree paper, writing paper, notes and the like. Examples thereof include FX-L paper (manufactured by Fuji Xerox Co., Ltd.), 4024-paper (manufactured by Fuji Xerox Co., Ltd.) and the like.

In order to shorten the drying time of ink on the surface of plain paper, the viscosity or surface tension of the ink may be decreased, or a penetrating agent (for example, a surface active agent) may be appropriately added to the ink as described above.

The surface tension of the ink is preferably 45 mN/m or less, more preferably 40 mN/m or less, and further preferably 25 to 38 mN/m. The preferable respective ranges of the surface tension of the black ink and the color ink, which are used in combination, are 30 to 45 mN/m (more preferably 25 to 35 mN/m) and 28 to 38 mN/m, respectively. If the surface tension of these inks exceeds 45 mN/m, the drying time of the ink may become longer, or the fixing intensity of a black image may be deteriorated.

The number-average particle size of dispersed particles present in the black ink is adjusted in the range of, preferably 15 to 100 nm, more preferably 15 to 70 nm, and further preferably 15 to 60 nm. If the number-average particle size is less than 15 nm, the viscosity of the ink is liable to become higher, and clogging of a nozzle is liable to occur. Further, if the number-average particle size exceeds 100 nm, the storage stability of the ink is liable to be deteriorated. The particle size of the dispersed particles used in the present invention is measured by using a particle size analyzer Microtrac Ultrafine Particle Analyzer (UPA) 9340 (manufactured by Leeds & Northrup) without diluting the ink. As the parameters to be inputted during the measurement, a viscosity of the test ink is adopted as the viscosity and a density of the coloring material is adopted as the density of the dispersed particles.

The number of particles contained in one liter of black ink, of which particle size is 0.5 µm or more is adjusted to preferably $7.5 \times 10^{10}$ or less, and more preferably $5 \times 10^{10}$ or less. If the number of particles having a particle size of 0.5 µm or more exceeds $7.5 \times 10^{10}$, the printing reliability is liable to become low. In the present invention, as for the number of particles having a particle size of 0.5 μm or more, an optical particle sizer, Accusizer™ 770 Optical Particle Sizer (manufactured by Particle Sizing Systems Inc.) is used as a measuring apparatus. This measuring apparatus is provided so as to detect particles passing a measuring part by using an optical method. The measurement is carried out by charging 2 μl of an aqueous ink jet recording liquid into a measuring cell and following a given measuring method, and the number of particles is reduced into a value for one liter of black ink. After a pigment dispersoid to be used for ink is brought into a state of water dispersoid or made into an ink composition, particles having a particle size of 0.5 μm or more can be reduced by centrifugation, filtration or the like.

The number-average particle size of the dispersed particles (mainly, particles of carbon black) in the black ink is adjusted preferably in the range of 15 to 100 nm, more preferably in the range of 15 to 70 nm, and further preferably in the range of 15 to 60 nm. If the number-average particle size is less than 15 nm, the viscosity of the black ink is liable to become higher and clogging is liable to occur. If the number-average particle size exceeds 100 nm, the storage stability of the black ink is liable to be deteriorated.

The particle size of dispersed particles in the present invention is measured by using a particle size analyzer, Microtrac Ultrafine Particle Analyzer (UPA) 9340 (manufactured by Leeds & Northrup) without diluting the black ink to be measured. As the parameters to be inputted during the measurement, a viscosity of the black ink to be measured is adopted as the viscosity and a density of the carbon black is adopted as the density of the dispersed particles.

The number of particles (mainly, particles of carbon black) contained in one liter of black ink, having a particle size of 0.5 μm or more, is adjusted to preferably $7.5 \times 10^{10}$ or less, and more preferably $5 \times 10^{10}$ or less. If the number of particles having a particle size of 0.5 μm or more exceeds $7.5 \times 10^{10}$, the printing reliability is liable to become low.

In the present invention, as for the number of particles having a particle size of 0.5 μm or more, a particle size analyzer, Accusizer™ 770 Optical Particle Sizer (manufactured by Particle Sizing Systems Inc.) is used as a measuring apparatus. This measuring apparatus is provided so as to detect particles passing a measuring part by using an optical method.

The measurement is carried out by charging 2 μl of a black ink to be measured into a measuring cell and following a given measuring method, and the number of particles is reduced into a value for one liter of the black ink. After a pigment (carbon black) dispersoid to be used for ink is brought into a state of water dispersoid or made into an ink composition, particles having a particle size of 0.5 μm or more can be reduced by centrifugation, filtration or the like.

The viscosity of the ink is adjusted preferably in the range of 1.5 to 5.0 mPa·s, and more preferably in the range of 1.5 to 3.5 mPa·s. If the viscosity of the ink is less than 1.5 mPa·s, the ejecting stability of the ink deteriorates. If the viscosity of the ink exceeds 10 mPa·s, the ejecting force becomes lower. As a result, a problem is liable to occur that clogging of the ink may not easily be removed, or the like.

The electric conductivity of the ink varies depending on materials added to the ink. The electric conductivity of the black ink is adjusted generally in the range of 0.05 to 0.4 S/m, and preferably in the range of 0.07 to 0.3 S/m. The electric conductivity of the color ink is adjusted generally in the range of 0.05 to 2 S/m, and preferably in the range of 0.07 to 1.5 S/m. If the electric conductivity of each ink is not within the above defined range, the storage stability of the ink is liable to deteriorate.

The pH of the ink is preferably 5.0 to 11.0, and more preferably 7.5 to 9.0. If the pH of the ink is less than 5.0, clogging at the tip end of a nozzle is liable to occur. If the pH exceeds 11.0, a head component member is liable to be corroded or molten.

Preparation Method of Ink

The ink of the present invention is prepared by mixing ingredients of the ink. Particularly, if the color material is a pigment (containing carbon black), a given amount of the pigment is added to an aqueous solution containing a given amount of dispersing agent, the mixture is sufficiently stirred, and thereafter, the mixture is dispersed using a dispersing machine to thereby remove coarse particles by centrifugal separation or the like. Subsequently, various components such as a given solvent, additives and the like are added, and the mixture is stirred, mixed and filtered so as to obtain the ink. In this case, it is also possible to use a method in which a concentrated dispersed solution of the pigment is prepared and diluted at the time of preparing the ink. Alternatively, it is also possible to mix the given solvent, water and the dispersing agent, then add the pigment, and disperse the mixture using the dispersing machine.

The above-described dispersing machine may be any among commercially available machines. Example thereof include a colloid mill, a flowjet mill, a slasher mil, a high speed disperser, a ball mill, an attritor, a sand mill, a sand grinder, an ultra-fine mill, an Igar motor mill, a dyno mill, a pearl mill, an agitator mill, a cobol mill, a triple roller, a twin roller, an extruder, a kneader, a micro-fluidizer, a laboratory homogenizer, an ultrasonic wave homogenizer, a high-pressure homogenizer and the like. These may be used either singly or in combination.

In a process of dispersing the pigment, various types of stirring and dispersing machines can be used as described above. When a dispersing machine is used which uses a so-called dispersing medium such as a ball (or a bead) formed from glass, ceramics, metal or the like, a large amount of inorganic impurities is often mixed in a pigment dispersion liquid or an ink due to crushing of the pigment, and abrasion of a dispersing medium and a dispersion vessel in the dispersing process. Accordingly, it is desirable to use a dispersing machine that does not use a dispersing medium. Particularly, it is preferable to use an ultrasonic-wave homogenizer and/or a high pressure homogenizer. In the case of conducting dispersion using an ultrasonic-wave homogenizer, it is desirable to conduct dispersion after evacuation, heating, and anti-foaming and deaeration using a commercially available degassing/deaerating device. When a dispersing machine that uses a dispersing medium is used, if desired, mixed inorganic impurities are removed.

After the dispersion, removal of coarse particles by centrifugal separation is preferably carried out. After coarse particles are removed by filtration or the like if necessary, a given solvent, additives and the like are added, stirred, and thereafter, filtered so as to prepare the ink. Alternatively, it is also possible to add a water dispersoid of dispersed pigment, a given solvent, additives and the like, then stir and mix the pigment, and remove coarse particles by dispersion, centrifugal separation, filtration or the like.

An ink jet recording method of the present invention is not particularly limited as long as an image is recorded (printed) by discharging an ink onto a recording medium. For example, known methods such as a piezoelectric ink jet method or a thermal ink jet method may also be used. However, it is preferable to use a thermal ink jet recording method from the standpoint of realizing high speed printing of an ink jet printer and improvement of image resolution.

Further, an apparatus used in the ink jet recording method of the present invention is not particularly limited. For example, an ordinary ink jet recording apparatus, a recording apparatus equipped with a heater and the like for controlling drying of the ink, a recording apparatus which is equipped with an intermediate transferring mechanism, and which, after printing the ink on an intermediate material, transfers the printed ink to a recording medium such as paper and the like.

Next, a preferred embodiment of an ink jet recording apparatus of the present invention will be described in detail with reference to the attached drawings. It should be noted that the same or equivalent portions will be denoted by the same reference numerals, and an overlapping description will be omitted.

Figure 1:
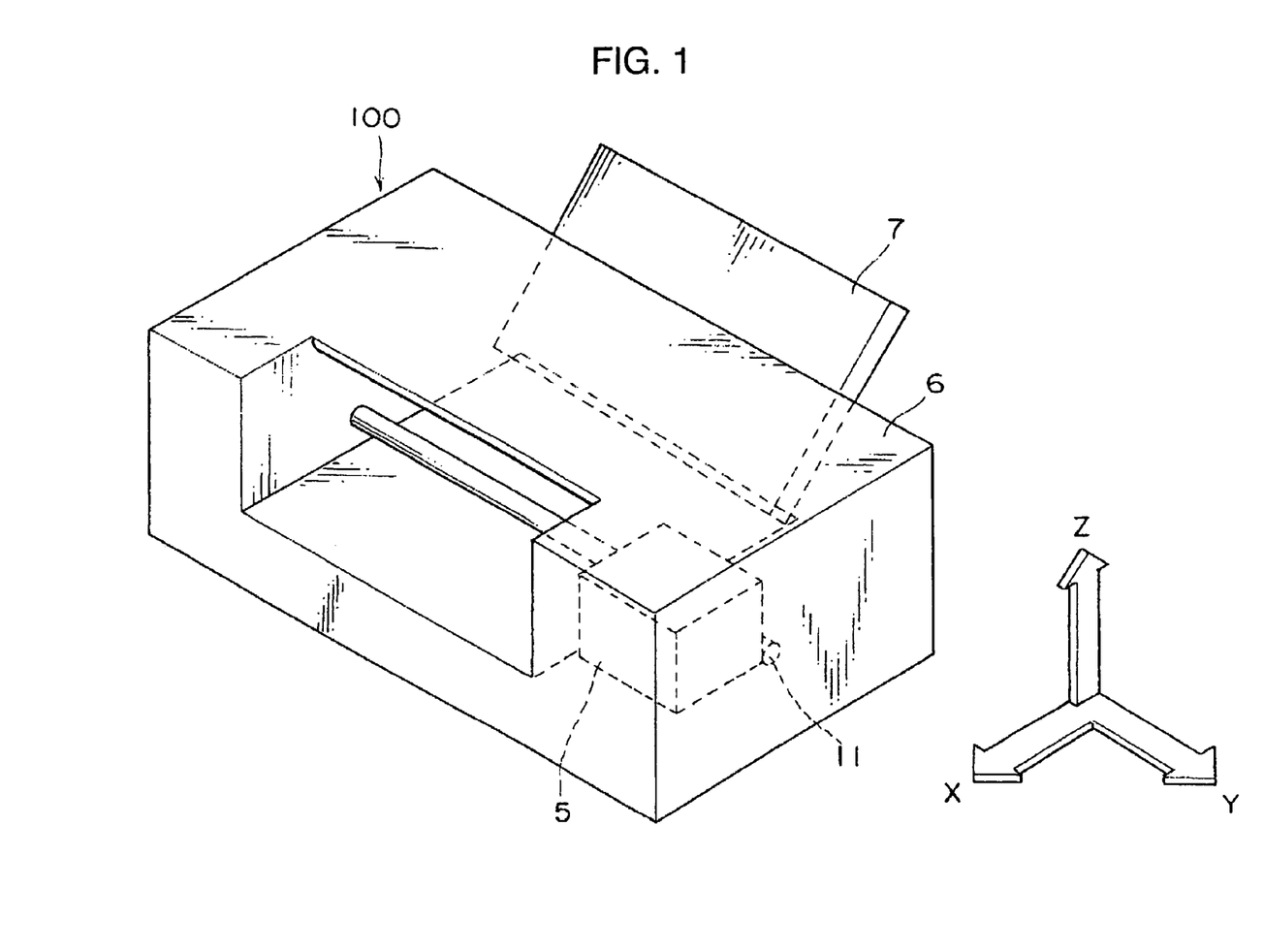
FIG. 1 is a diagram showing an external structure of an ink jet recording apparatus according to an embodiment of the present invention.
Figure 2:
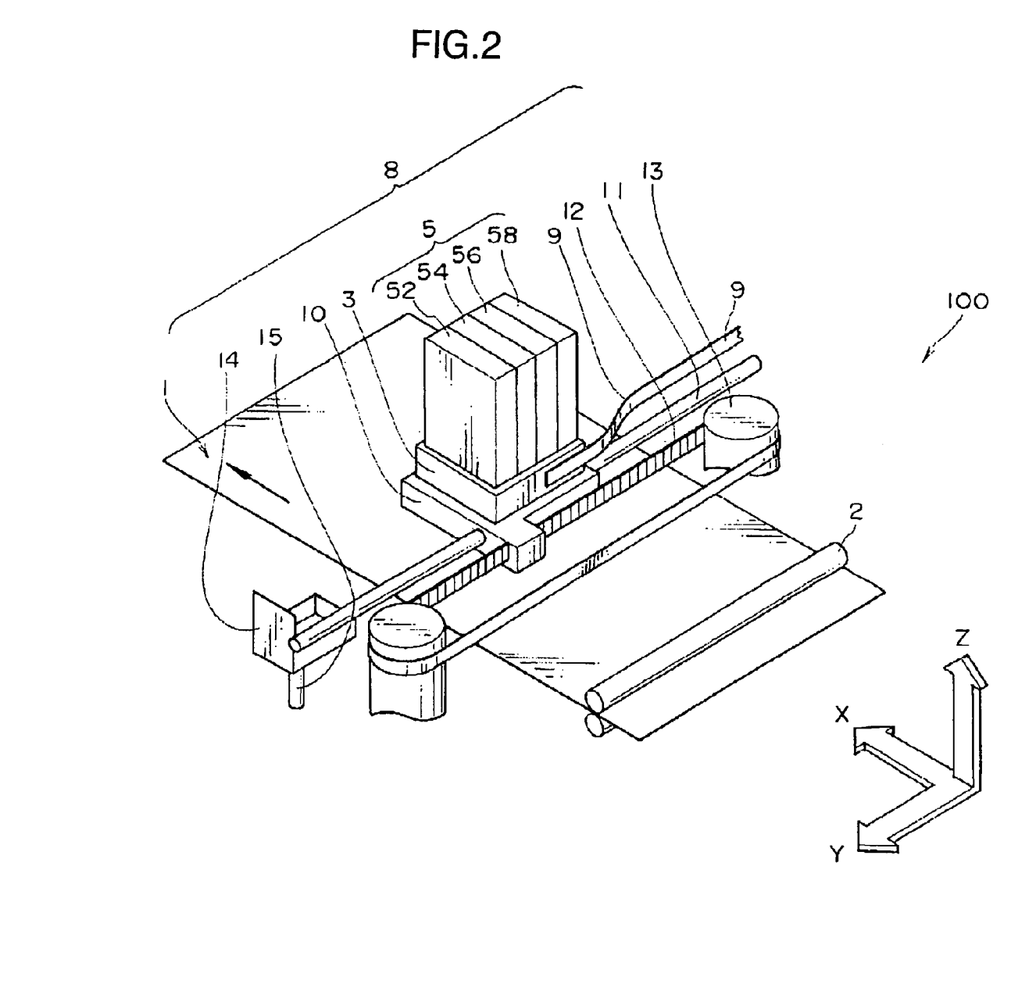
FIG. 2 is a perspective view showing a basic structure of an interior in the ink jet recording apparatus shown in FIG. 1.

FIG. 1 is a perspective view showing the outside structure of an ink jet recording apparatus according to a preferred embodiment of the present invention. FIG. 2 is a perspective view showing a basic structure of an interior of the ink jet recording apparatus shown in FIG. 1. An ink jet recording apparatus 100 of the present embodiment has a structure that operates based on the above-described ink jet recording method of the present invention to thereby form an image. That is, as shown in FIGS. 1 and 2, the ink jet recording apparatus 100 is mainly formed by an outside cover 6, a tray 7 on which a predetermined amount of recording medium 1 such as plain paper can be placed, a conveying roller (conveying means) 2 for conveying the recording medium 1 into the ink jet recording apparatus 100 one by one, and an image recording section 8 (image recording means) that forms an image by discharging an ink onto the surface of the recording medium 1.

The conveying rollers 2 are a pair of roller disposed within the ink jet recording apparatus 100 in a rotatable manner. The pair of conveying rollers 2 nip the recording medium 1 set on the tray 7, and conveys a predetermined amount of recording medium 1 one by one at a predetermined timing.

In the image recording section 8, an image is formed by an ink on the surface of the recording medium 1. The image recoding section 8 is mainly comprised of a recording head 3, an ink tank 5, a power-supply signal cable 9, a carriage 10, a guide rod 11, a timing belt 12, a driving pulley 13, and a maintenance unit 14.

The ink tank 5 includes ink tanks 52, 54, 56, and 58 in which inks of different colors are accommodated in such a manner as to be dischargeable therefrom. The recording head 3 and the ink tank 5 are formed by a recording head for a black ink, that discharges (ejects) a black ink, and an ink tank for a black ink, and also by a recording head for a color ink, that discharges (ejects) a color ink, and an ink tank for a color ink.

Further, as shown in FIG. 2, the power-supply signal cable 9 and the ink tank 5 are each connected to the recording head 3. When external image recording information is inputted from the power-supply signal cable 9 to the recording head 3, the recording head 3 sucks in a predetermined amount of ink from each ink tank based on the image recording information, and ejects the ink on the surface of the recording medium. The power-supply signal cable 9 also serves to supply, to the recording head 3, electric power required for driving the recording head 3 in addition to the image recording information.

Moreover, the recording head 3 is disposed and held on the carriage 10, and the timing belt 12 connected to the guide rod 11 and the driving pulley 13 is connected to the carriage 10. Due to this structure, the recording head 3 is movable along the guide rod 11 in a direction parallel to the surface of the recording medium 1 with fine particles scattered thereon and also in a direction indicated by arrow Y (main scanning direction) that is perpendicular to the conveying direction X of the recording medium 1 (sub-scanning direction). Namely, due to the driving pulley 13 being rotated at a predetermined timing based on the image recording information, the carriage 10 equipped with the recording head 3 is driven along the guide rod 11 via the timing belt 12. That is, due to the carriage 10 being made to reciprocate in a direction indicated by arrow Y (main scanning direction) that is perpendicular to the conveying direction X of the recording medium 1 (sub-scanning direction), an image is formed in a predetermined region on the surface of the recording medium 1.

The ink jet recording apparatus 100 is provided with controlling means (not shown) that controls the driving timing of the recording head 3 and the driving timing of the carriage 10 based on the image recording information. As a result, an image based on the image recording information can be continuously formed along the conveying direction X in a predetermined region on the surface of the recording medium 1 that is conveyed at a predetermined speed.

Further, the maintenance unit 14 is connected to a pressure reducing device (not shown) via a tube 15. The maintenance unit 14 is also connected to a nozzle portion of the recording head 3, and has a function of sucking in ink from a nozzle of the recording head 3 by bringing the interior of a nozzle of the recording head 3 into a pressure-reduced state. Providing of the maintenance unit 14 makes it possible to remove, if necessary, excess ink adhering to the nozzle during the operation of the ink jet recording apparatus 100, or prevent evaporation of ink from the nozzle when the operation of the apparatus is stopped.

The preferred embodiment of the ink jet recording apparatus of the present invention was described above in detail, but the present invention is not limited to the same.

EXAMPLES

The present invention will be hereinafter described more specifically based on the examples, but is not limited to the same.

Preparation of Ink

Ingredients (the contents thereof are each indicated by a mass ratio) shown in Table 1 are mixed and stirred, and thereafter, a pigment ink is adjusted with 1N—NaOH so that the pH becomes 8, and is filtered by a membrane filter having a pore size of 2 µm, and a dye ink is adjusted with 1N—NaOH so that the pH becomes 7, and is filtered by a membrane filter having a pore size of 0.45 µm, thereby preparing these inks. The pigment dispersing liquid 1 is prepared as described below.

Preparation of Pigment Dispersing Liquid 1

CAB-O-JET300 (manufactured by Cabot Corporation) is diluted so that a pigment has a concentration of 10% by mass, and thereafter, subjected to centrifugal separation of 8000 prm for 30 minutes, to thereby obtain a pigment dispersing liquid. The obtained pigment dispersing liquid is dried up and the pigment content is measured, and pure water is added thereto so that the pigment concentration becomes 8% by mass.

TABLE 1

| | Black Ink 1 | Black Ink 2 | Black Ink 3 | Black Ink 4 | Black Ink 5 | Cyan Ink 1 | Cyan Ink 2 | Magenta Ink 1 | Magenta Ink 2 | Yellow Ink 1 | Yellow Ink 2 |
|---|---|---|---|---|---|---|---|---|---|---|---|
| pigment dispersing liquid 1 | 37.5 | 37.5 | 37.5 | 37.5 | 37.5 | — | — | — | — | — | — |
| DB199 | — | — | — | — | — | 3 | 3 | — | — | — | — |
| AR52 | — | — | — | — | — | — | — | 2.5 | 2.5 | — | — |
| DY144 | — | — | — | — | — | — | — | — | — | 2 | 2 |
| DEG | 20 | 20 | 20 | 20 | 20 | 20 | 20 | 20 | 20 | 20 | 20 |
| BCBT | — | — | — | — | — | 4.5 | 4.5 | 4.5 | 4.5 | 4.5 | 4.5 |
| Urea | — | — | — | — | — | 6 | 6 | 6 | 6 | 6 | 6 |
| surface active agent 1 | — | — | — | 2 | — | 1 | 1 | 1 | 1 | 1 | 1 |
| surface active agent 2 | 0.05 | 0.05 | 0.05 | — | 0.05 | — | — | — | — | — | — |
| Magnesium acetate · tetra hydrate | — | — | — | — | — | 2.6 | — | 2.6 | — | 2.6 | — |
| anion polymer 1 | 0.5 | — | — | 0.5 | 0.25 | — | — | — | — | — | — |
| anion polymer 2 | — | 1 | — | — | — | — | — | — | — | — | — |
| BIT | 0.02 | 0.02 | 0.02 | 0.02 | 0.02 | — | — | — | — | — | — |
| Water | 41.93 | 41.43 | 42.43 | 39.98 | 42.18 | 62.9 | 65.5 | 63.4 | 66 | 63.9 | 66.5 |

The marks shown in Table 1 represent the following ingredients:
DB means C.I. Direct Blue;
AR means C.I. Acid Red;
DY means C.I. Direct Yellow;
DEG means diethylene glycol;
BCBT means diethylene glycol monobutyl ether;
surface active agent 1 means polyoxyethylene adduct of acetylene glycol;
surface active agent 2 means polyoxyethylene adduct of 2-ethyl hexanol;
anion polymer 1 means sodium salt of styrene/acrylic acid copolymer (mass-average molecular weight: 5,000, acid value: 205);
anion polymer 2 means sodium salt of styrene/acrylic acid copolymer (mass-average molecular weight: 13,000, acid value: 250);
anion polymer 3 means sodium salt of styrene/acrylic acid copolymer (mass-average molecular weight: 7,500, acid value: 390); and
BIT means 1,2-benzisothiazoline-3-on.

The prepared inks are measured for the following characteristics. The results are shown in Table 2.

Surface Tension of Ink

In an atmosphere of 23° C. and 55% RH, each ink is measured for a surface tension using a Wilhelmy's surface tension balance.

Viscosity of Ink

Each ink is assessed for the viscosity using Reomat 115 (manufactured by Contraves), by charging an aqueous ink jet recording liquid in a measurement vessel and fitting the vessel in the apparatus in accordance with a given measuring method. The measurement is conducted under the conditions of 23° C. and the shear rate of 1400 $s^{-1}$.

Drying Time of Ink

In a case in which a solid image of various color inks is printed on each surface of FX-L paper (manufactured by Fuji Xerox Co., Ltd.) and 4024-paper (manufactured by Xerox Corporation) by a prototyped ink jet recording apparatus (of a thermal ink jet system; the amount of a droplet of black ink: 15 ng; the amount of a droplet of color ink: 5 ng; that is the same as the following ink jet recording apparatus), the time required until the printed image is no longer transferred to each of these papers, that is superposed thereon, is measured.

TABLE 2

| | ink surface tension (mN/m) | ink viscosity (mPa · s) | drying time of ink (s) L-paper | drying time of ink (s) 4024-paper |
|---|---|---|---|---|
| Black Ink 1 | 41 | 2.1 | 10 | 15 |
| Black Ink 2 | 39 | 2.5 | 7 | 10 |
| Black Ink 3 | 45 | 2.0 | 15 | 20 |
| Black Ink 4 | 30 | 2.3 | <3 | <3 |
| Black Ink 5 | 42 | 2.1 | 10 | 15 |
| Cyan Ink 1 | 36 | 2.7 | <3 | <3 |
| Cyan Ink 2 | 30 | 2.7 | <3 | <3 |
| Magenta Ink 1 | 37 | 2.5 | <3 | <3 |
| Magenta Ink 2 | 29 | 2.2 | <3 | <3 |
| Yellow Ink 1 | 38 | 2.4 | <3 | <3 |
| Yellow Ink 2 | 30 | 2.1 | <3 | <3 |

Examples 1 to 5 and Comparative Examples 1 to 3

By fitting, in an ink jet recording apparatus, each of combinations of ink set shown in Table 3 below, which ink set includes combinations of the above inks as shown in Table 3, each ink is ejected to FX-L paper (manufactured by Fuji Xerox Co., Ltd.) and 4024-paper (manufactured by Xerox Corporation) so that the overprint density, equivalent ratio (equivalent ratio of an anionic functional group of a water-soluble polymer in the black ink to metal of a coagulating agent (polyvalent metal salt) in the color ink), amounts of these inks, and time lag of printing between the black ink and the color ink are each set as shown in Table 3. The printed images are used for the following image evaluation.

The overprint density (%) shown in Table 3 indicates the total amount of color inks to be printed in a printed region of black ink by a value on the basis of a solid print rated as 100%. The ratio of amount between these three color inks used is set to be equal.

Further, the ink jet recording apparatus shown in Table 3 is a prototype that is of a thermal ink jet system and has the specifications: the amount of a droplet of a black ink is 15 ng; the amount of a droplet of a color ink is 5 ng; and the resolution is 800 dpi×800 dpi.

a: No bleeding is found b: A slight bleeding within an allowable range is found c: A bleeding is observed.

d: A mustache-like bleeding is observed in many parts.

(3) Evaluation of Drying Characteristics

A solid image is printed on FX-L paper (manufactured by Fuji Xerox Co., Ltd.) and 4024-paper (manufactured by Xerox Corporation) in the same manner as in the above printing test, and is observed. The time passed until no droplet is visually found on the paper after the printing is finished is measured. The criteria for evaluation are as follows.

b: 5 seconds or less c: more than 5 seconds and less than 10 seconds d: 10 seconds or more

TABLE 3

| | Ink Type | | | overprint density (%) | equivalence ratio | ratio of ink amount | time lag of printing |
|---|---|---|---|---|---|---|---|
| | Black | Cyan | Magenta | Yellow | | | |
| Example 1 | 1 | 1 | 1 | 1 | 50 | 0.89 | 0.17 | 16 |
| Example 2 | 2 | 1 | 1 | 1 | 75 | 1.44 | 0.25 | 16 |
| Example 3 | 5 | 1 | 1 | 1 | 200 | 0.11 | 0.67 | 32 |
| Example 4 | 1 | 1 | 2 | 2 | 75 | 1.78 | 0.25 | 16 |
| Example 5 | 5 | 1 | 1 | 1 | 300 | 0.07 | 1.0 | 32 |
| Comparative Example 1 | 1 | 2 | 2 | 2 | 50 | — | 0.17 | 16 |
| Comparative Example 2 | 3 | 1 | 1 | 1 | 100 | 0 | 0.30 | 16 |
| Comparative Example 3 | 4 | 1 | 1 | 1 | 50 | 0.89 | 0.17 | 16 |

Image Evaluation

The images obtained by the above examples and comparative examples are each evaluated as follows. The results are shown in Table 4.

(1) Optical Density

A solid image is printed on FX-L paper (manufactured by Fuji Xerox Co., Ltd.) and 4024-paper (manufactured by Xerox Corporation) using the above-described printing apparatus, and the optical density is determined by measuring the recorded matter using an optical densitometer X-Rite MODEL 404 (manufactured by X-Rite Co., Ltd.). The criterion for evaluation is set as described below.

"a" means those having an optical density of 1.4 or more

"b" means those having an optical density of 1.3 or more and less than 1.4

"c" means those having an optical density of 1.2 or more and less than 1.3

"d" means those having an optical density of less than 1.2

(2) Evaluation of Image Quality

The prepared inks are each subjected to a printing sensory test in which a line image is printed on FX-L paper (manufactured by Fuji Xerox Co., Ltd.) and 4024-paper (manufactured by Xerox Corporation) by using the above-described printing apparatus, and are examined according to the following criteria.

TABLE 4

| | (1) optical density | | (2) evaluation of image quality | | (3) evaluation of drying characteristics | |
|---|---|---|---|---|---|---|
| | L paper | 4024 paper | L paper | 4024 paper | L paper | 4024 paper |
| Example 1 | a | B | b | b | b | b |
| Example 2 | a | B | b | b | b | b |
| Example 3 | a | B | b | b | b | b |
| Example 4 | a | B | b | b | b | c |
| Example 5 | b | B | b | b | b | b |
| Comparative Example 1 | c | D | b | b | b | b |
| Comparative Example 2 | c | D | b | b | b | b |
| Comparative Example 3 | b | B | d | d | b | b |

As apparent from the results shown in Table 4, in the present examples in which at least one part of a black image portion is formed with a black ink that contains a water-soluble polymer having an anionic functional group and that has a long drying time, and a color ink that contains a coagulating agent (preferably, polyvalent metal salt) and that has a short drying time, even if a black ink using carbon black as a black pigment is used, a line image or a solid image of black ink is excellent, and excellent optical density, image quality, and drying characteristics are obtained, which image has sharpness at an image edge portion and does not have thickening of a line.

It can be understood that, due to the equivalent ratio between an anionic functional group of the water-soluble polymer, and a coagulating agent (preferably, polyvalent metal salt) being set within a specified range, the optical density, image quality and drying characteristics can be further improved.

As described above, the present invention can provide ink jet recording method and apparatus, which uses carbon black as a black pigment having excellent optical density, water resistance and light fastness, and satisfies the image quality of a black image, such as sharpness in an image edge portion, no thickening of a line, and the like.

What is claimed is:

1. An ink jet recording method in which a color image is recorded by discharging, onto a recording medium, black ink, and color ink consisting essentially of a cyan ink, a magenta ink, and/or a yellow ink,
    wherein the black ink contains carbon black, water, a water-soluble organic solvent, and a water-soluble polymer having an anionic functional group, and has a drying time of more than 5 seconds to 10 seconds on the recording medium, and
    at least one kind of the color ink contains color material, water, a water-soluble organic solvent, and a coagulating agent, and has a drying time of 0.5 seconds to 3 seconds on the recording medium.

2. The ink jet recording method according to claim 1, wherein a part or all of a black image portion in the color image is formed with the black ink and the color ink.

3. The ink jet recording method according to claim 2, wherein in a part or all of the black image portion in the color image, the black ink and the color ink are discharged so that an equivalent ratio of the anionic functional group of the water-soluble polymer contained in the black ink to a metal or a cationic functional group of the coagulating agent contained in the color ink becomes 0.1 to 1.5.

4. The ink jet recording method according to claim 1, wherein the coagulating agent is polyvalent metal salt.

5. The ink jet recording method according to claim 1, wherein the water-soluble polymer has an acid value of 100 to 300.

6. The ink jet recording method according to claim 1, wherein the water-soluble polymer has a mass-average molecular weight of 3,000 to 10,000.

7. The ink jet recording method according to claim 1, wherein the carbon black is self-dispersible carbon black.

8. The ink jet recording method according to claim 2, wherein in a part or all of the black image portion in the color image, a ratio of an amount of the discharged color ink to an amount of the discharged black ink is 0.05 to 1.

9. The ink jet recording method according to claim 2, wherein in a part or all of the black image portion in the color image, a time lag between printing with the black ink and printing with the color ink is 20 milliseconds or less.

10. The ink jet recording method according to claim 2, wherein in a part or all of the black image portion in the color image, an amount of the discharged color ink is varied in accordance with a size of a print area of the black ink.

11. An ink jet recording apparatus comprising a black-ink recording head that ejects a black ink onto a recording medium, and a color-ink recording head that ejects color ink consisting essentially of a cyan ink, a magenta ink and/or a yellow ink, onto the recording medium, the apparatus carrying out recording of a color image by discharging the black ink and the color ink onto the recording medium,
    wherein the black ink contains carbon black, water, a water-soluble organic solvent, and a water-soluble polymer having an anionic functional group, and has a drying time of more than 5 seconds to 10 seconds on the recording medium, and
    at least one kind of the color ink contains color material, water, a water-soluble organic solvent, and a coagulating agent, and has a drying time of 0.5 seconds to 3 seconds on the recording medium.

12. The ink jet recording apparatus according to claim 11, wherein a part or all of a black image portion in the color image is formed with the black ink and the color ink.

13. The ink jet recording apparatus according to claim 12, wherein in a part or all of the black image portion in the color image, the black ink and the color ink are discharged so that an equivalent ratio of the anionic functional group of the water-soluble polymer contained in the black ink to a metal or a cationic functional group of the coagulating agent contained in the color ink becomes 0.1 to 1.5.

14. The ink jet recording apparatus according to claim 11, wherein the coagulating agent is polyvalent metal salt.

15. The ink jet recording apparatus according to claim 11, wherein the water-soluble polymer has an acid value of 100 to 300.

16. The ink jet recording apparatus according to claim 11, wherein the water-soluble polymer has a mass-average molecular weight of 3,000 to 10,000.

17. The ink jet recording apparatus according to claim 11, wherein the carbon black is self-dispersible carbon black.

18. The ink jet recording apparatus according to claim 12, wherein in a part or all of the black image portion in the color image, a ratio of an amount of the discharged color ink to an amount of the discharged black ink is 0.05 to 1.

19. The ink jet recording apparatus according to claim 12, wherein in a part or all of the black image portion in the color image, a time lag between printing with the black ink and printing with the color ink is 20 milliseconds or less.

20. The ink jet recording apparatus according to claim 12, wherein in a part or all of the black image portion in the color image, an amount of the color ink to be discharged is varied in accordance with a size of a print area of the black ink.

* * * * *